(12) United States Patent
Ni

(10) Patent No.: US 12,210,909 B2
(45) Date of Patent: Jan. 28, 2025

(54) AUTOSCALING GPU APPLICATIONS IN KUBERNETES BASED ON GPU UTILIZATION

(71) Applicant: SAP SE, Walldorf (DE)

(72) Inventor: Peng Ni, Singapore (SG)

(73) Assignee: SAP SE, Walldorf (DE)

( * ) Notice: Subject to any disclaimer, the term of this patent is extended or adjusted under 35 U.S.C. 154(b) by 512 days.

(21) Appl. No.: 17/488,422

(22) Filed: Sep. 29, 2021

(65) Prior Publication Data

US 2023/0109368 A1    Apr. 6, 2023

(51) Int. Cl.
*G06F 9/50* (2006.01)
*G06F 9/455* (2018.01)
*G06F 9/54* (2006.01)
*G06T 1/20* (2006.01)

(52) U.S. Cl.
CPC .......... *G06F 9/505* (2013.01); *G06F 9/45558* (2013.01); *G06F 9/541* (2013.01); *G06T 1/20* (2013.01)

(58) Field of Classification Search
CPC ...... G06F 9/505; G06F 9/45558; G06F 9/541; G06F 9/5061; G06T 1/20
See application file for complete search history.

(56) References Cited

U.S. PATENT DOCUMENTS

| | | | |
|---|---|---|---|
| 9,143,412 B1 * | 9/2015 | Nay | H04L 67/12 |
| 9,726,502 B2 | 8/2017 | Ni et al. | |
| 9,778,051 B2 | 10/2017 | Vo et al. | |
| 10,360,263 B2 | 7/2019 | Ni et al. | |
| 11,157,338 B2 | 10/2021 | Rodean et al. | |
| 11,222,066 B1 | 1/2022 | Batsakis et al. | |
| 11,843,545 B1 | 12/2023 | Vasamsetti et al. | |
| 11,860,899 B2 | 1/2024 | Hassan | |
| 2014/0040474 A1 | 2/2014 | Blagodurov et al. | |
| 2014/0193154 A1 | 7/2014 | Graham et al. | |
| 2015/0154057 A1 | 6/2015 | McGrath et al. | |

(Continued)

OTHER PUBLICATIONS

Brewer, "Kubernetes the path to cloud native." Proceedings of the sixth ACM symposium on cloud computing, Aug. 2015, 27 pages.

(Continued)

*Primary Examiner* — Jorge A Chu Joy-Davila
(74) *Attorney, Agent, or Firm* — Fish & Richardson P.C.

(57) ABSTRACT

Methods, systems, and computer-readable storage media for executing, within the container orchestration system, the application using one or more resource units, each resource unit including an application container and an ancillary container, the ancillary container executing a set of GPU metric exporters, receiving, from the application and for each resource unit, a GPU metric including a GPU utilization associated with a respective resource unit, determining, for each resource unit, a custom GPU metric based on a respective GPU metric, the custom GPU metric aggregating values of the respective GPU metric over a time period, determining, by an autoscaler, an average GPU metric based on one or more custom GPU metrics, and selectively scaling, by the autoscaler, the application within the container orchestration system based on the average GPU metric by adjusting a number of resource units executing the application.

20 Claims, 5 Drawing Sheets

(56) References Cited

U.S. PATENT DOCUMENTS

| | | | |
|---|---|---|---|
| 2016/0054782 A1* | 2/2016 | Kaburlasos | G06F 1/3234 |
| | | | 713/320 |
| 2016/0373327 A1* | 12/2016 | Degioanni | G06F 11/3093 |
| 2018/0152958 A1 | 5/2018 | Arnold et al. | |
| 2018/0288129 A1* | 10/2018 | Joshi | H04L 43/20 |
| 2019/0036808 A1 | 1/2019 | Shenoy et al. | |
| 2019/0102226 A1 | 4/2019 | Caldato et al. | |
| 2020/0371950 A1 | 11/2020 | Gupta et al. | |
| 2021/0034673 A1 | 2/2021 | Ni et al. | |
| 2021/0191762 A1* | 6/2021 | Ocray, Jr. | G06F 9/4881 |
| 2021/0191769 A1* | 6/2021 | Eschinger | G06F 9/5077 |
| 2021/0357376 A1 | 11/2021 | Jain | |
| 2022/0244949 A1 | 8/2022 | Iqbal et al. | |
| 2022/0245003 A1 | 8/2022 | Oh | |
| 2022/0374284 A1 | 11/2022 | Kirmse | |
| 2022/0413992 A1 | 12/2022 | Nguyen et al. | |
| 2023/0040676 A1* | 2/2023 | Kita | H04L 41/5045 |
| 2023/0094159 A1 | 3/2023 | Difranco et al. | |
| 2023/0104787 A1 | 4/2023 | Hassan | |
| 2023/0124068 A1 | 4/2023 | Hassan | |

OTHER PUBLICATIONS

Cox et al., "Serverless inferencing on Kubernetes." arXiv preprint arXiv:2007.07366, Jul. 2020, 5 pages.

Docs.Oracle.com [oneline], "2.6 The JCMD Utility" Sep. 2015 [retrieved on Sep. 29, 2021], retrieved from : URL <https://docs.oracle.com/javase/8/docs/technotes/guides/troubleshoot/tooldescr006.html>, 4 pages.

LeCun et al, "Deep learning." nature 521.7553, May 2015, 9 pages.

Prometheus.io [online], "Prometheus—Monitoring System and Time Series Database" Jan. 2015 [retrieved on Sep. 29, 2021], retrieved from : URL <https://prometheus.io/>, 5 pages.

Thurgood et al., "Cloud computing with Kubernetes cluster elastic scaling." Proceedings of the 3rd International Conference on Future Networks and Distributed Systems, Jul. 2019, 7 pages.

Wei-guo et al., "Research on Kubernetes' Resource Scheduling Scheme." Proceedings of the 8th International Conference on Communication and Network Security, Nov. 2018, 5 pages.

Final Office Action in U.S. Appl. No. 17/495,017, mailed on Sep. 16, 2024, 45 pages.

Medium.com [online], "How We Maintain Tenant Data Isolation with Kafka at Scale" Dec. 2020, retrieved on Jun. 17, 2024, retrieved from URL <https://medium.com/gong-tech-blog/how-we-use-kafka-to-maintain-tenant-data-isolation-at-scale-ad501f2dc572>, 20 pages.

Non-Final Office Action in U.S. Appl. No. 17/495,017, mailed on Apr. 29, 2024, 39 pages.

Non-Final Office Action in U.S. Appl. No. 17/503,560, mailed on Jun. 23, 2023, 11 pages.

* cited by examiner

AUTOSCALING GPU APPLICATIONS IN KUBERNETES BASED ON GPU UTILIZATION

BACKGROUND

In modern software deployments, containerization is implemented, which can be described as operating system (OS) virtualization. In containerization, applications (or microservices, software processes) are run in isolated user spaces referred to as containers. The containers use the same shared OS, and each provides a fully packaged and portable computing environment. That is, each container includes everything an application needs to execute (e.g., binaries, libraries, configuration files, dependencies). Because a container is abstracted away from the OS, containerized applications can execute on various types of infrastructure. For example, using containers, an application can execute in any of multiple cloud-computing environments.

Container orchestration automates the deployment, management, scaling, and networking of containers. For example, container orchestration systems, in hand with underlying containers, enable applications to be executed across different environments (e.g., cloud computing environments) without needing to redesign the application for each environment. Enterprises that need to deploy and manage a significant number of containers (e.g., hundreds or thousands of containers) leverage container orchestration systems. An example container orchestration system is the Kubernetes platform, maintained by the Cloud Native Computing Foundation, which can be described as an open-source container orchestration system for automating computer application deployment, scaling, and management.

At a high level, the Kubernetes platform is made up of a central database containing descriptions of the required states of resources managed in the platform, and a collection of controllers. The controllers monitor the required state of the resources they are tasked to and take any required action to make sure that the actual states of the resources match the required states. The controllers also update the Kubernetes central database with the current resource status. In some instances, a user interacts with the cluster by modifying the required state of a resource and waiting for the relevant controller to modify the actual state of the resource to match. Kubernetes provides an autoscaling feature, which increases a number of nodes as the demand for service response increases and decreases the number of nodes as the demand decreases.

Various technology platforms leverage the processing power of graphics processing units (GPUs), which have a higher number of cores and advanced parallel processing as compared to central processing units (CPUs). Kubernetes has support for managing GPUs across nodes. However, GPU applications cannot benefit from the autoscaling feature of Kubernetes due to the absence of a built-in GPU utilization metric.

SUMMARY

Implementations of the present disclosure are directed to an autoscaling framework for scaling of applications based on GPU utilization. More particularly, and as described in further detail herein, the autoscaling framework of the present disclosure exports GPU utilization using an ancillary container (e.g., a sidecar container) to provide a custom GPU metric that is used to selectively scale an application.

In some implementations, actions include executing, within the container orchestration system, the application using one or more resource units, each resource unit including an application container and an ancillary container, the ancillary container executing a set of GPU metric exporters, receiving, from the application and for each resource unit, a GPU metric including a GPU utilization associated with a respective resource unit, determining, for each resource unit, a custom GPU metric based on a respective GPU metric, the custom GPU metric aggregating values of the respective GPU metric over a time period, determining, by an autoscaler, an average GPU metric based on one or more custom GPU metrics, and selectively scaling, by the autoscaler, the application within the container orchestration system based on the average GPU metric by adjusting a number of resource units executing the application. Other implementations of this aspect include corresponding systems, apparatus, and computer programs, configured to perform the actions of the methods, encoded on computer storage devices.

These and other implementations can each optionally include one or more of the following features: the GPU metric includes GPU utilization and the custom GPU metric includes average GPU utilization over the time period; the GPU metric is received from a service executing with the application, the service exposing the application through a first port and exposing the GPU metric through a second port that is different from the first port; the autoscaler receives the custom GPU metric through an application programming interface (API), the custom metric being determined by a custom metric adapter that exposes the custom GPU metric through the API; selectively scaling includes increasing the number of resource units in response to determining that a current number of resource units is less than a target number of resource units; selectively scaling comprises decreasing the number of resource units in response to determining that a current number of resource units greater than a target number of resource units; and the container orchestration system includes Kubernetes and each resource unit includes a pod and the ancillary container includes a sidecar container.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
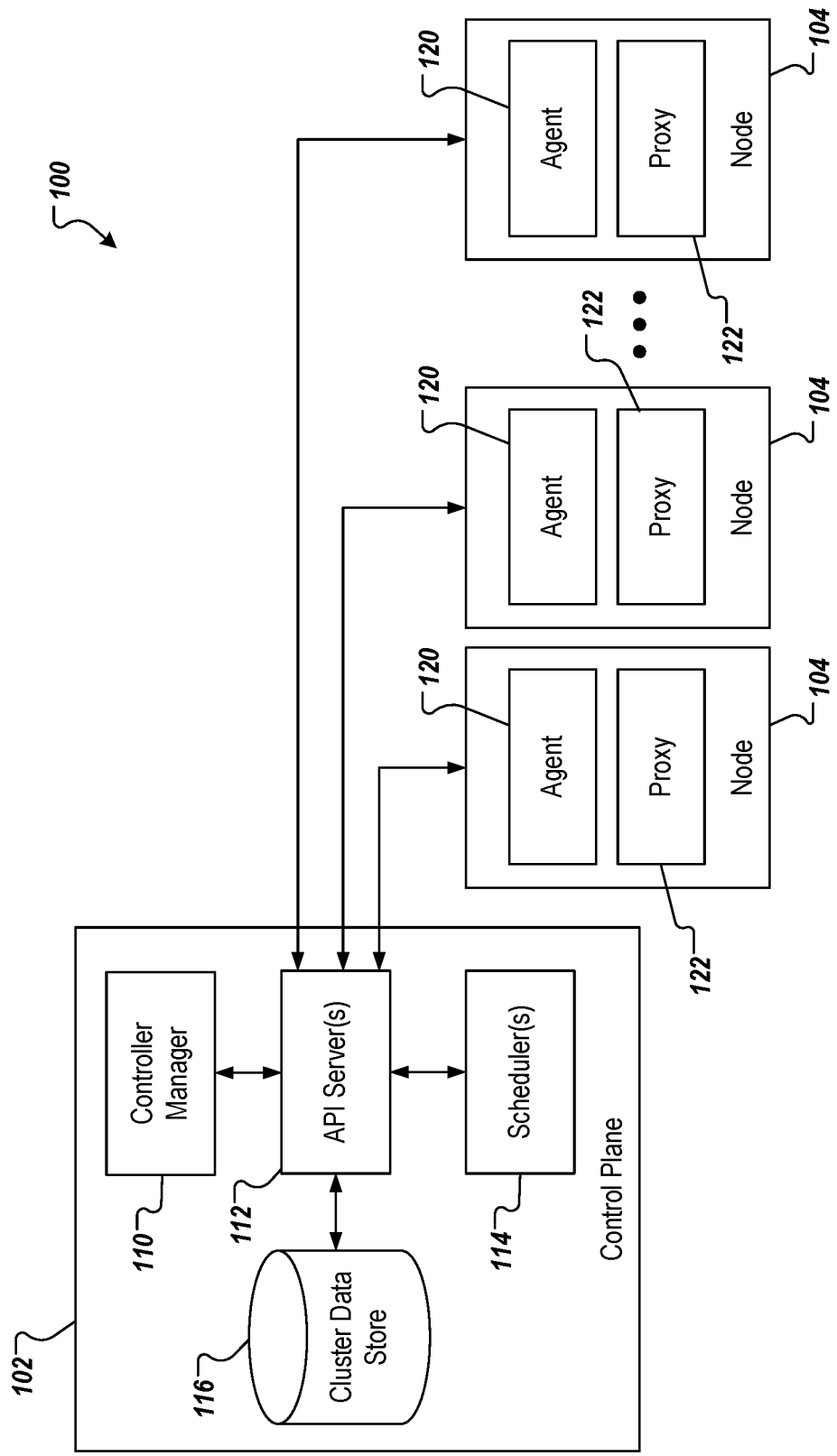
FIG. 1 depicts an example container orchestration architecture.

Implementations of the present disclosure are directed to an autoscaling framework for scaling of applications based on GPU utilization. More particularly, and as described in further detail herein, the autoscaling framework of the present disclosure exports GPU utilization using an ancillary container (e.g., a sidecar container) to provide a custom GPU metric that is used to selectively scale an application.

In some implementations, actions include executing, within the container orchestration system, the application using one or more resource units, each resource unit including an application container and an ancillary container, the ancillary container executing a set of GPU metric exporters, receiving, from the application and for each resource unit, a GPU metric including a GPU utilization associated with a respective resource unit, determining, for each resource unit, a custom GPU metric based on a respective GPU metric, the custom GPU metric aggregating values of the respective GPU metric over a time period, determining, by an autoscaler, an average GPU metric based on one or more custom GPU metrics, and selectively scaling, by the autoscaler, the application within the container orchestration system based on the average GPU metric by adjusting a number of resource units executing the application.

To provide further context for implementations of the present disclosure, and as introduced above, in modern software deployments containerization is implemented, which can be described as operating system (OS) virtualization. In containerization, applications (or microservices, software processes) are run in isolated user spaces referred to as containers. The containers use the same shared OS, and each provides a fully packaged and portable computing environment. That is, each container includes everything an application needs to execute (e.g., binaries, libraries, configuration files, dependencies). Because a container is abstracted away from the OS, containerized applications can execute on various types of infrastructure. For example, using containers, an application can execute in any of multiple cloud-computing environments.

Container orchestration automates the deployment, management, scaling, and networking of containers. For example, container orchestration systems, in hand with underlying containers, enable applications to be executed across different environments (e.g., cloud computing environments) without needing to redesign the application for each environment. Enterprises that need to deploy and manage a significant number of containers (e.g., hundreds or thousands of containers) leverage container orchestration systems. An example container orchestration system is the Kubernetes platform, maintained by the Cloud Native Computing Foundation, which can be described as an open-source container orchestration system for automating computer application deployment, scaling, and management.

At a high level, the Kubernetes platform is made up of a central database containing descriptions of the required states of resources managed in the platform, and a collection of controllers. The controllers monitor the required state of the resources they are tasked to and take any required action to make sure that the actual states of the resources match the required states. The controllers also update the Kubernetes central database with the current resource status. In some instances, a user interacts with the cluster by modifying the required state of a resource and waiting for the relevant controller to modify the actual state of the resource to match. Kubernetes provides an autoscaling feature, which increases a number of nodes as the demand for service response increases and decreases the number of nodes as the demand decreases.

An attractive feature of Kubernetes is scalability, which allows the applications and infrastructures hosted to scale in and out on demand. Kubernetes manages containers with pods, which are the smallest deployable objects in Kubernetes. Each pod can contain one or more containers, and the containers in the same pod share resources of the pod (e.g., networking and storage resources). Applications can be defined as Kubernetes deployments, which are backed by a number of identical pods running application containers. The number of pods can also be referred to as the number of replicas. The application is exposed to the externals of the Kubernetes cluster through a Kubernetes service (also referred to as ingress). The autoscaling feature of Kubernetes is realized by a component called a horizontal pod autoscaler, which periodically scales the number of pods in a deployment by checking a metric. Example metrics can include, without limitation, average central processing unit (CPU) utilization and average memory utilization.

Various technology platforms leverage the processing power of graphics processing units (GPUs), which have a higher number of cores and advanced parallel processing as compared to CPUs. For example, artificial intelligence (AI) and machine learning (ML) technologies have advanced tremendously in the past years and encompass applications including, without limitation, computer vision, natural language processing (NLP), speech recognition, visual object recognition, and object detection. In general, a ML model is a computational model that is composed of multiple processing layers to learn representations of data with multiple levels of abstraction.

One of the reasons for the success of AI/ML is due to the increasing computing power of GPUs. Kubernetes has support for managing GPUs across nodes, which can be achieved by device plugins running as DaemonSets on each node. Kubernetes exposes GPUs as a schedulable resource. However, applications that are executed using GPUs (referred to herein as GPU applications) cannot benefit from the autoscaling feature of Kubernetes due to the absence of a built-in GPU utilization metric. Some frameworks (e.g., Knative serving) bring in additional scaling metrics to Kubernetes including concurrency and requests per second (RPS). However, concurrency and RPS are application dependent. An application targeted at light-weight tasks can handle much more concurrency and RPS than an application designed for heavy tasks (e.g., AI/ML applications). Consequently, autoscaling policies based on concurrency and/or RPS need to be manually tuned for each application (i.e., application-specific tuning), and is subject to reconfiguration when the application has a new release, for example, which may bring performance changes.

In view of the above context, implementations of the present disclosure provide an autoscaling framework for scaling of applications based on GPU utilization. More particularly, and as described in further detail herein, the autoscaling framework of the present disclosure exports GPU utilization using an ancillary container to provide a custom GPU metric that is used to selectively scale an application. In some implementations, the GPU utilization is exported from the application through a service and the custom GPU metric is calculated as an aggregation of values of the GPU utilization over time. In some examples, the custom GPU metric is compared to one or more thresholds to selectively scale the application by adjusting a number of resource units that execute the application within a container orchestration system.

FIG. 1 depicts an example container orchestration architecture 100 in accordance with implementations of the present disclosure. In the depicted example, the example container orchestration architecture 100 represents deployment of a portion of a container orchestration system, Kubernetes introduced above. More particularly, the example architecture 100 represents a basic structure of a cluster within Kubernetes In the example of FIG. 1, the example architecture 100 includes a control plane 102 and a plurality of nodes 104. Each node 104 can represent physical worker machines and are configured to host pods. In Kubernetes, a pod is the smallest deployable unit of resources and each pod is provided as one or more containers with shared storage/network resources, and a specification for how to run the containers. In some examples, a pod can be referred to as a resource unit that includes an application container. The control plane 102 communicates with the nodes 104 and is configured to manage all of the nodes 104 and the pods therein.

In further detail, the control plane 102 is configured to execute global decisions regarding the cluster as well as detecting and responding to cluster events. In the example of FIG. 1, the control plane 102 includes a control manager 110, one or more application programming interface (API) server(s) 112, one or more scheduler(s) 114, and a cluster data store 116. The API server(s) 112 communicate with the nodes 104 and exposes the API of Kubernetes to exchange information between the nodes 104 and the components in the control plane 102 (e.g., the cluster data store 116). In some examples, the control plane 102 is set with more than one API server(s) 112 to balance the traffic of information exchanged between the nodes 104 and the control plane 102. The scheduler(s) 114 monitor the nodes 104 and execute scheduling processes to the nodes 104. For example, the scheduler(s) 114 monitors events related to newly created pods and selects one of the nodes 104 for execution, if the newly created pods are not assigned to any of the nodes 104 in the cluster.

The cluster data store 116 is configured to operate as the central database of the cluster. In this example, resources of the cluster and/or definition of the resources (e.g., the required state and the actual state of the resources) can be stored in the cluster data store 116. The controller manager 110 of the control plane 102 communicates with the nodes 104 through the API server(s) 112 and is configured to execute controller processes. The controller processes can include a collection of controllers and each controller is responsible for managing at least some or all of the nodes 104. The management can include, but is not limited to, noticing and responding to nodes when an event occurs, and monitoring the resources of each node (and the containers in each node). In some examples, the controller in the controller manager 110 monitors resources stored in the cluster data store 116 based on definitions of the resource. As introduced above, the controllers also verify whether the actual state of each resource matches the required state. The controller is able to modify or adjust the resources, so that actual state matches the required state depicted in the corresponding definition of the resources.

In some examples, the controllers in the controller manager 110 should be logically independent of each other and be executed separately. In some examples, the controller processes are all compiled into one single binary that is executed in a single process to reduce system complexity. It is noted the control plane 102 can be run/executed on any machine in the cluster. In some examples, the control plane 102 is run on a single physical worker machine that does not host any pods in the cluster.

In the example of FIG. 1, each node 104 includes an agent 120 and a proxy 122. The agent 120 is configured to ensure that the containers are appropriately executing within the pod of each node 104. The agent 120 is referred to as a kubelet in Kubernetes. The proxy 122 of each node 104 is a network proxy that maintains network rules on nodes 104. The network rules enable network communication to the pods in the nodes 104 from network sessions inside or outside of the cluster. The proxy 122 is a kube-proxy in Kubernetes.

Figure 2:
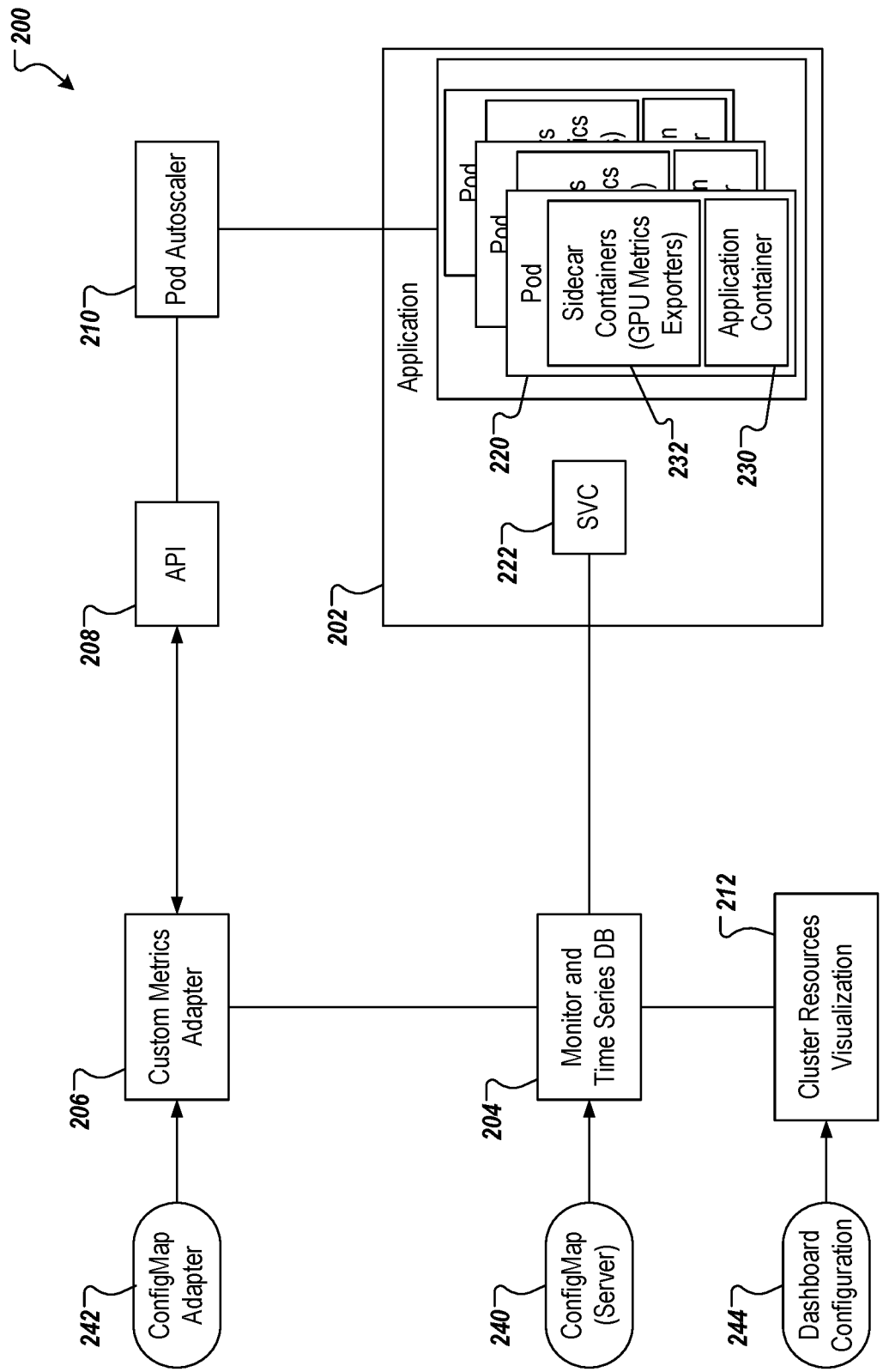
FIG. 2 depicts an example architecture that can be used to execute implementations of the present disclosure.

FIG. 2 depicts an example architecture 200 that can be used to execute implementations of the present disclosure. More particularly, the example architecture of FIG. 2 incorporates the autoscaling framework of the present disclosure. In the example of FIG. 2, the example architecture 200 includes an application 202, a monitor and time series database component 204, a custom metrics adapter 206, an API 208, a pod autoscaler 210, and a cluster resources visualization module 212.

In some examples, the application 202 is executed using one or more GPUs, and can be referred to as a GPU application (i.e., an application that is executed using GPUs). For example, the application 202 can be an AI/ML application that leverages the processing power of GPUs to provide functionality (e.g., computer vision, NLP, speech recognition, visual object recognition, object detection). In the example of FIG. 2, the application 202 is executed using pods 220 (also referred to as resource units herein) and includes a service 222 for communicating with other components, as described herein. As used herein, the term autoscale refers to automatically changing (scaling) a number of pods 220 in response to instructions received from the pod autoscaler 210. This scaling is executed automatically indicating that human intervention is absent in determining when and how (e.g., up, down) the pods 220 are scaled. In some examples, scaling out of the application 202 can include allocating a new node and installing a driver for instantiation of a (new) pod 220 with application container 230 and sidecar container 232.

Each pod 220 includes an application container 230 and one or more sidecar containers 232. An application container 230 can be described as an independent, self-contained unit that includes binaries of the application 202 as well as the software dependencies and the hardware requirements needed to run the application 202. A sidecar container 232 can be described as an ancillary container that runs alongside the application container 230 within the pod 220 and provides ancillary functionality in support of execution of the application 202. In the context of the present disclosure, the sidecar container 232 executes a GPU metrics exporter, which receives GPU metrics for the GPUs executing the application 202. The GPU metrics collected by the GPU metrics exporter within the sidecar container 232 are exposed through the service 222, as described in further detail herein.

For purposes of illustration, a non-limiting example of GPUs is referenced herein. It is contemplated, however, that implementations of the present disclosure can be realized with any appropriate GPU. The example GPUs include GPUs provided by Nvidia Corporation. Using this example, a container for the DCGM-exporter (nvidia-dcgm-exporter) and a container for the GPU metrics exporter (pod-nvidia-gpu-metrics-exporter) are injected as sidecar containers 232 to export GPU utilization metrics.

The service 222 enables communication with the application 202. In some examples, the service 222 communicates using one of a plurality of ports depending on the communication. For example, the application 202 can be exposed for communication through a first port (e.g., port 8500 for Tensorflow, port 7070 for TorchServe). The GPU metrics from the sidecar containers 232 are exposed for communication through a second port that is different from the first port (e.g., port 9400). In the example of FIG. 2, the service 222 communicates the GPU metrics to the monitor and time series database 204 through the second port.

In some examples, the GPU metrics are provided in a format, such that the GPU metrics are readily consumable by the monitor and time series database 204. For example, the monitor and time series database 204 can be provided using Prometheus, which can be described as an open-source time series database for monitoring and includes a collection of client libraries that enable metrics to be published for collection. In the example of Prometheus, the GPU metrics are provided in the Prometheus format, which can be described as a text-based, line-oriented format. In some examples, each GPU metric is provided as a name with annotated labels and a sequence of metric values can form a time series. For example, the following example is representative of a Nvidia GPU utilization metric dcgm_gpu_utilization of a specific GPU 0 with a respective universally unique identifier (UUID) and the utilization value at the time of query is 50%:

dcgm_gpu_utilizationfgpu="0", uuid="GPU-43241973-8440-4c19-7a9b-73ae1a4c570e"g-50

Example GPU Utilization Metric

The GPU metric is provided for each GPU that is executing the application 202, each GPU metric indicating the particular GPU that the metric represents (e.g., by GPU number and/or UUID).

The following example snippets of Listing 1 from a file (e.g., a text document that contains data formatted using YAML (YAML Ain't Markup Language), a human-readable data format used for data serialization) represent an example of a deployment and service configuration for a Tensorflow serving application (e.g., the application 202) with Nvidia GPU. It is appreciated that, for purposes of illustration and clarity, Listing 1 is not a complete listing (e.g., volumeMounts and other information are absent). In the example of Listing 1, the service tfserving-service (e.g., the service 222) exposes the Tensorflow serving application (e.g., the application 202) at port grpc 8500 and the GPU metrics at port monitoring 9400.

Listing 1: Example YAML Snippets

```
apiVersion: apps/v1
kind: Deployment
metadata:
  name: tfserving-deployment
spec:
  replicas: 1
  selector:
    matchLabels:
      app: tfserving-server
  template:
    metadata:
      labels:
        app: tfserving-server
    spec:
      containers:
      -   image: tensorflow/serving:2.5.0-rc3-gpu
          name: tfserving-container
          ports:
          -   containerPort: 8500
              name: grpc
              protocol: TCP
      -   image: nvidia/dcgm-exporter:1.4.6
          name: nvidia-dcgm-exporter
      -   image: nvidia/pod-gpu-metrics-exporter:v1.0.0-alpha
          name: pod-nvidia-gpu-metrics-exporter
          ports:
          -   containerPort: 9400
              hostPort: 9400
              name: gpu-metrics
              protocol: TCP
---
apiVersion: v1
kind: Service
metadata:
  name: tfserving-service
spec:
  ports:
  -   name: grpc
      port: 8500
      protocol: TCP
      targetPort: 8500
  -   name: monitoring
      port: 9400
      protocol: TCP
      targetPort: 9400
  selector:
    app: tfserving-server
  type: LoadBalancer
```

The monitor and time series database component 204 (e.g., provided as a Prometheus server) is used to monitor the GPU metrics exported from the application 202 through the service 222 and store the values in a time-series database. The monitor and time series database component 204 adds Kubernetes resource annotations (e.g. namespace, pod) to the GPU metrics data received from the application 202. In some examples, the monitor and time series database component 204 is configured with a configuration map (ConfigMap) 240. The following example snippet of Listing 2 from a YAML file represents configuration of how the monitor and time series database component 204 can be configured with the ConfigMap 240 to read the exported GPU utilization metric. In the example of Listing 2, a scrape job named gpu is defined to query the service tfserving-service (e.g., the service 222) with port monitoring at 1-second intervals.

Listing 2: Example Server Configuration (ConfigMap (Server))

```
apiVersion: v1
kind: ConfigMap
metadata:
```

Listing 2: Example Server Configuration (ConfigMap (Server))

```
name: prometheus-server
namespace: monitoring
data:
  prometheus.yml: |
    scrape_configs:
    - job_name: 'gpu'
      scrape_interval: 1s
      honor_labels: true
      metrics_path: /gpu/metrics
      scheme: http
      kubernetes_sd_configs:
      - role: endpoints
        namespaces:
          names:
          - default
      relabel_configs:
      - source_labels:[___meta_kubernetes_service_name]
        regex: tfserving-service
        action: keep
      - source_labels: [___meta_kubernetes_endpoint_port_name]
        regex: monitoring
        action: keep
      - source_labels: [___meta_kubernetes_namespace]
        target_label: kubernetes_namespace
      - source_labels: [___meta_kubernetes_pod_name]
        target_label: kubernetes_pod_name
```

Using the example configuration of Listing 2, a set of labels is automatically attached to the GPU utilization metric. Example labels include, without limitation, Kubernetes namespace (the namespace within Kubernetes that the application 202 is executed within) and Kubernetes pod name (a unique identifier for the pod that the GPU is handling execution for). For example, and continuing with the example GPU utilization metric above, an annotated GPU utilization metric can be provided as:

Example GPU Utilization Metric with Labels

```
dcgm_gpu_utilizationfgpu="0",instance="100.96.0.6:9400",
job="gpu",kubernetes namespace="default",kubernetes pod name=
"chargriddeployment-676f5cc78d-8nb4g",uuid="GPU-43241973-8440-
4c19-7a9b- 73ae1a4c570e"g - 50
```

The custom metrics adapter 206 bridges the monitor and time series database component 204 and the pod autoscaler 210. In the example context of Prometheus, the custom metrics adapter 206 can be provided as a Prometheus adapter, which can be installed on Kubernetes using Helm chart. The custom metrics adapter 206 reads GPU metrics from the monitor and time series database component 204, transforms the data to provide a custom GPU metric and maps the custom GPU metric to a respective pod 220. An example custom GPU metric can include, without limitation, an aggregated average GPU utilization for a period of time (e.g., 1 minute). The custom metrics adapter 206 exposes the custom GPU metric and associated pod name for access through the API 208. Accordingly, each pod is associated with a respective custom GPU metric (e.g., a pair including pod name and custom GPU metric).

The following example snippet of Listing 3 represents an example configuration for the custom metrics adapter 206 using a ConfigMap 242 to provide the custom GPU metric and associated pod name for consumption:

Listing 3: Example Adapter Configuration (ConfigMap (Server))

```
apiVersion: v1
kind: ConfigMap
metadata:
  name: prometheus-adapter
  namespace: default
data:
  config.yaml: |
    rules:
    -  seriesQuery: 'dcgm_gpu_utilization'
       resources:
         overrides:
           kubernetes_namespace: {resource: "namespace"}
           kubernetes_pod_name: {resource: "pod"}
       name:
         matches: ".*"
         as: "1m_avg_gpu_utilization"
       metricsQuery: avg_over_time(<<.Series>>[1m])
```

In the example of Listing 3, custom metrics adapter 206 targets the GPU metric dcgm_gpu_utilization and issues a query avg_over_time (<<. Series>>[1m]) on the GPU metric. As a result, for each pod 220, the average value of the GPU metric dcgm_gpu_utilization in the past one minute is computed and is exported as a custom GPU metric with name 1m_avg_gpu_utilization and associated pod name. As described in further detail herein, an average GPU metric is calculated based on the custom GPU metrics over all pods 220.

The GPUs are autoscaled by selectively increasing or decreasing the number of pods 220 executing the application 202. For example, for heavier loads (e.g., a relatively high demand on the application 202), the number of pods 220 is increased and, for lighter loads (e.g., relatively low demand on the application 202), the number of pods 220 is decreased. In accordance with implementations of the present disclosure, the pod autoscaler 210 automatically scales the pods 220 based on the custom GPU metric exposed by the custom metrics adapter 206.

The following example snippet of Listing 4 represents an example configuration for the pod autoscaler 210 to automatically scale based on the custom GPU metric(s):

Listing 4: Example Pod Autoscaler Configuration

```
kind: HorizontalPodAutoscaler
apiVersion: autoscaling/v2beta2
metadata:
  name: tfserving-hpa
  namespace: default
spec:
  scaleTargetRef:
      apiVersion: apps/v1
      kind: Deployment
      name: tfserving-deployment
  minReplicas: 1
  maxReplicas: 3
  metrics:
  -  type: Pods
     pods:
       metric:
         name: 1m_avg_gpu_utilization
       target:
         type: AverageValue
         averageValue: 60
```

In the example of Listing 4, the configuration is based on the custom GPU metric 1m_avg_gpu_utilization and calculates an average GPU metric ($GPU_{ut\_avg}$) over all pods. That is, the average GPU metric is determined as an average of all 1m_avg_gpu_utilization values. The target application deployment is tfserving-deployment (Tensorflow serving), with a minimum and maximum number of replicas (pods) set to 1 and 3, respectively. A scaling threshold ($GPU_{ut\_thr}$) is set to be 60%. That is, in the example of Listing 4, if the average GPU metric over meets or exceeds 60%, one or more pods 220 are added.

In the example of FIG. 2, the cluster resources visualization module 212 provides a visualization representing GPU utilization metrics collected in the monitor and time series database component 204. In some examples, the visualization is configured using a dashboard configuration 244 to can display relevant information. Example information can include, without limitation, snapshot analysis and time-series analysis. In some examples, the cluster resources visualization module 212 executes a visualization tool, such as Grafana provided by Grafana Labs. An example visualization can include multiple panels. Example panels can include, without limitation, individual GPU clocks at a current time, average GPU utilization across all nodes in a past time period (e.g., one minute), a total number of GPUs at a current time, the number of GPUs over time, individual GPU utilization at a current time, and individual GPU utilization over time. In some examples, in the panel displaying the average GPU utilization across all nodes, a horizontal line can be provided as an overlay to denote a scaling threshold (e.g., 60%).

Figure 3:
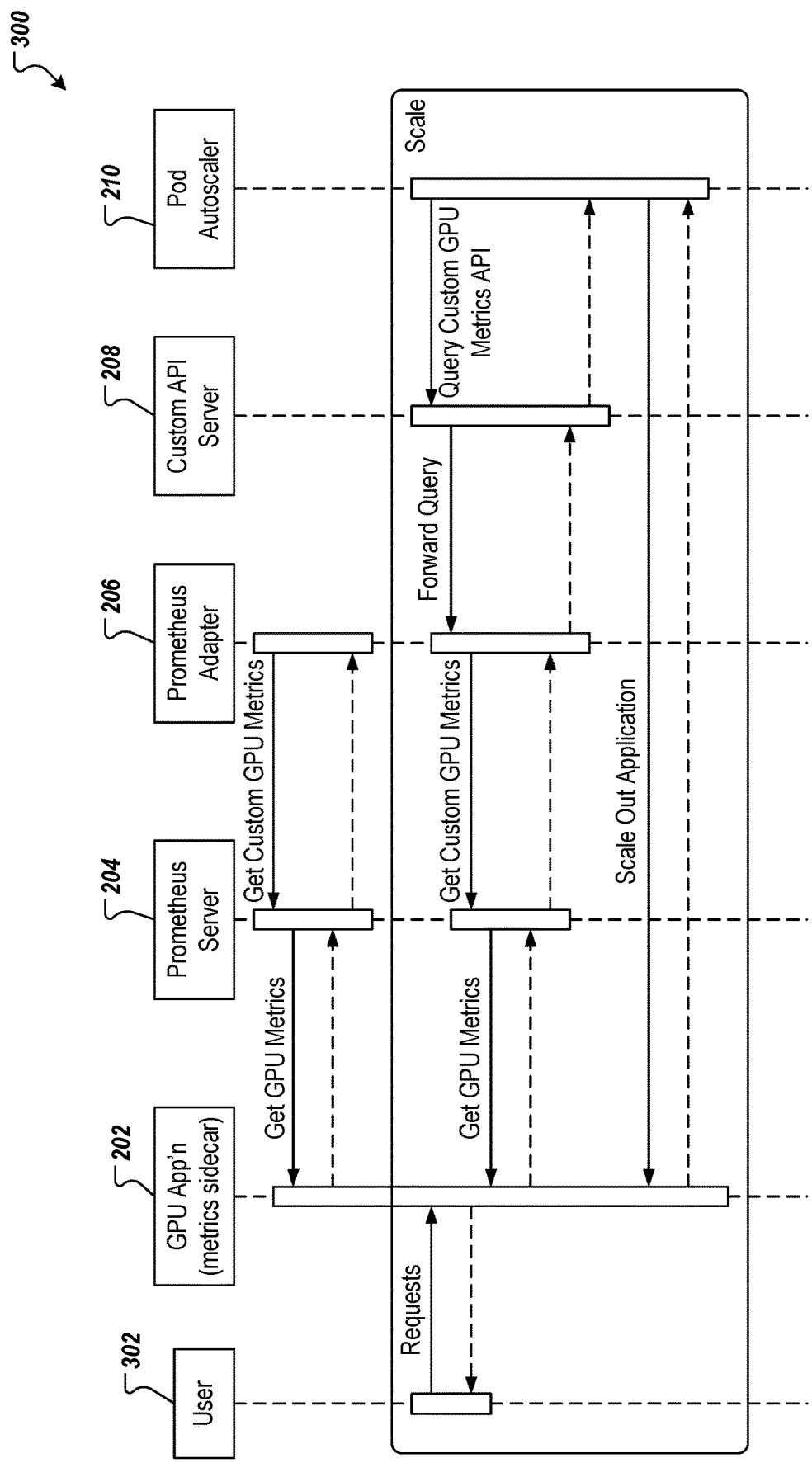
FIG. 3 depicts an example flow diagram in accordance with implementations of the present disclosure.

FIG. 3 depicts an example flow diagram 300 in accordance with implementations of the present disclosure. In the depicted example, the example flow diagram 300 depicts communication between various components in accordance with implementations of the present disclosure.

The example flow diagram 300 of FIG. 3 represents a scaling out scenario, in which a number of pods is increased in response to a custom GPU metric meeting or exceeding a threshold (e.g., 60%). The interactions between components occur at fixed time intervals to capture changes in GPU utilization. For example, the monitor and time series database component (Prometheus server) 204 retrieves GPU metrics from the application 202 (e.g., through the service 222) at a regular time interval (e.g., every 1 second).

In the example of FIG. 3, a user 302 sends requests to the application 202 as part of a workload on the application 202. Although a user 302 is represented in FIG. 3, it is contemplated that any appropriate entity can send a request to the application 202. For example, an application that leverages the functionality of the application 202 can send requests. In response to received requests, the GPU utilization increases. This change is captured by the monitor and time series database component (Prometheus server) 204 through the GPU metrics exposed by the sidecar container 232. The custom metrics adapter (Prometheus Adapter) 206 computes the custom GPU metric based on the GPU metrics. The pod autoscaler 210 reads the custom GPU metric exposed by the custom metrics adapter (Prometheus Adapter) 206, and triggers scaling out of the application 202 in response to determining that the custom API metric exceeds the threshold.

In some examples, scaling of the pods is executed by determining a target number of pods ($P_t$) based on the following example relationship:

$$P_t = CEIL\left[P_c * \left(\frac{GPU_{ut\_avg}}{GPU_{ut\_thr}}\right)\right] \quad (1)$$

where $P_c$ is the current number of pods. Accordingly, the autoscaler 210 scales the number of pods up (out) if the current number of pods is smaller than the target number of pods, and scales the number of pods down (in) if the current number of pods is larger than the target number of pods, and, otherwise, does nothing with respect to scaling. A non-limiting example for scaling out can be considered, in which two pods are executing with respective custom GPU metrics (1m_avg_gpu_utilization) of 100% and 80%, respectively. In this example, $GPU_{ut\_avg}$ is 90% and $P_t$ is determined to be:

$$P_t = CEIL\left[2 * \left(\frac{90}{60}\right)\right] = 3$$

Consequently, the number of pods is scaled out from 2 pods to 3 pods (i.e., scaled out by 1 pod). A non-limiting example for scaling in can be considered, in which two pods are executing with respective custom GPU metrics (1m_avg_gpu_utilization) of 10% and 20%, respectively. In this example, $GPU_{ut\_avg}$ is 15% and $P_t$ is determined to be:

$$P_t = CEIL\left[2 * \left(\frac{15}{60}\right)\right] = 1$$

Consequently, the number of pods is scaled in from 2 pods to 1 pod (i.e., scaled in by 1 pod).

Figure 4:
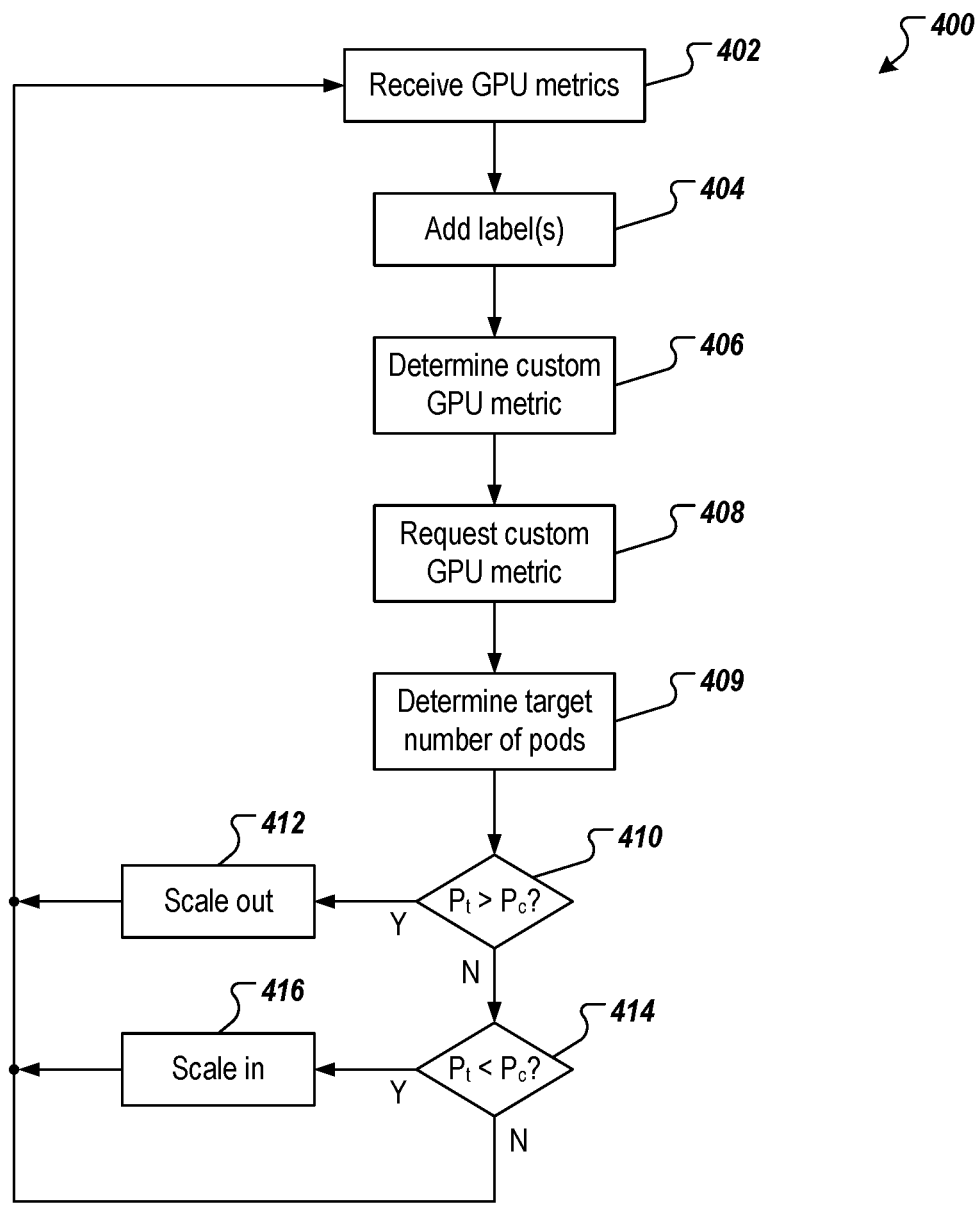
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable program executed by one or more computing devices.

GPU metrics are received (402). For example, and as described herein with reference to FIG. 2, the monitor and time series database 204 requests GPU metrics from the service 222 of the application 202 at regular intervals and receives the GPU metrics in response to each request. An example GPU metric is received as:

dcgm gpu utilizationfgpu="0", uuid="GPU-43241973-8440-4c19-7a9b-73ae1a4c570e"g-50 which indicates a 50% utilization for GPU 0 that is assigned the UUID GPU-43241973-8440-4c19-7a9b-73ae1a4c570e. As discussed herein, a GPU metric is received for each GPU executing the application 202. A set of label is added to the GPU metric (404). For example, and as described herein, the monitor and time series database 204 adds a set of labels into the GPU utilization metric. Example labels include the Kubernetes namespace that the application 202 is executed in and the Kubernetes pod name that corresponds to the GPU that is assigned to the pod 220 (i.e., the GPU associated with the metric). For example, and continuing with the example GPU utilization metric above, an annotated GPU metric, which includes the set of labels, can be provided as:

dcgm gpu utilizationfgpu="0",instance="100.96.0.6:9400", job="gpu",kubernetes namespace="default",kubernetes pod name= "chargriddeployment-676f5cc78d-8nb4g",uuid="GPU-43241973-8440-4c19-7a9b- 73ae1a4c570e"g - 50 which indicates a 50% utilization for GPU 0 that is assigned the UUID GPU-43241973-8440-4c19-7a9b-73ae1a4c570e, and that is processing for the pod chargrid-deployment-676f5cc78d-8nb4g, in the Kubernetes namespace default.

A custom GPU metric is determined (406). For example, and as described herein, the custom metrics adapter 206 reads GPU metrics from the monitor and time series database component 204, transforms the data to provide a custom GPU metric and maps the custom GPU metric to a respective pod 220. An example custom GPU metric can include, without limitation, an aggregated average GPU utilization for a period of time (e.g., 1 minute). The custom GPU metric is requested (408). For example, and as described herein, the custom metrics adapter 206 exposes the custom GPU metric and associated pod name for access through the API 208. The pod autoscaler 210 queries the custom API server 208 for the custom GPU metric and determines the average GPU metric over all pods.

A target number of pods is determined (409). For example, and as described herein, the autoscaler 210 determines the target number of pods ($P_t$) using Equation 1, above. It is determined whether the target number of pods ($P_t$) exceeds the current number of pods ($P_c$) (410). If the target number of pods ($P_t$) exceeds the current number of pods ($P_c$), the application is scaled out (412) and the example process 400 loops back. For example, and as described herein, scaling out of the application 202 can include determining a number of new pods to allocate (e.g., as the difference between $P_t$ and $P_a$), allocating one or more new nodes and, for each new node, installing a driver for instantiation of a pod 220 with application container 230 and sidecar container 232.

If the target number of pods ($P_t$) does not exceed the current number of pods ($P_c$), it is determined whether the target number of pods ($P_t$) is less than the current number of pods ($P_c$) (414). If the target number of pods ($P_t$) is less than the current number of pods ($P_c$), the application is scaled in (416) and the example process 400 loops back. For example, and as described herein, scaling in of the application 202 can include determining a number of pods to deconstruct (e.g., as the difference between $P_c$ and $P_t$), and deconstructing that number of pods. If the target number of pods ($P_t$) is not less than the current number of pods ($P_c$), the example process 400 loops back.

Figure 5:
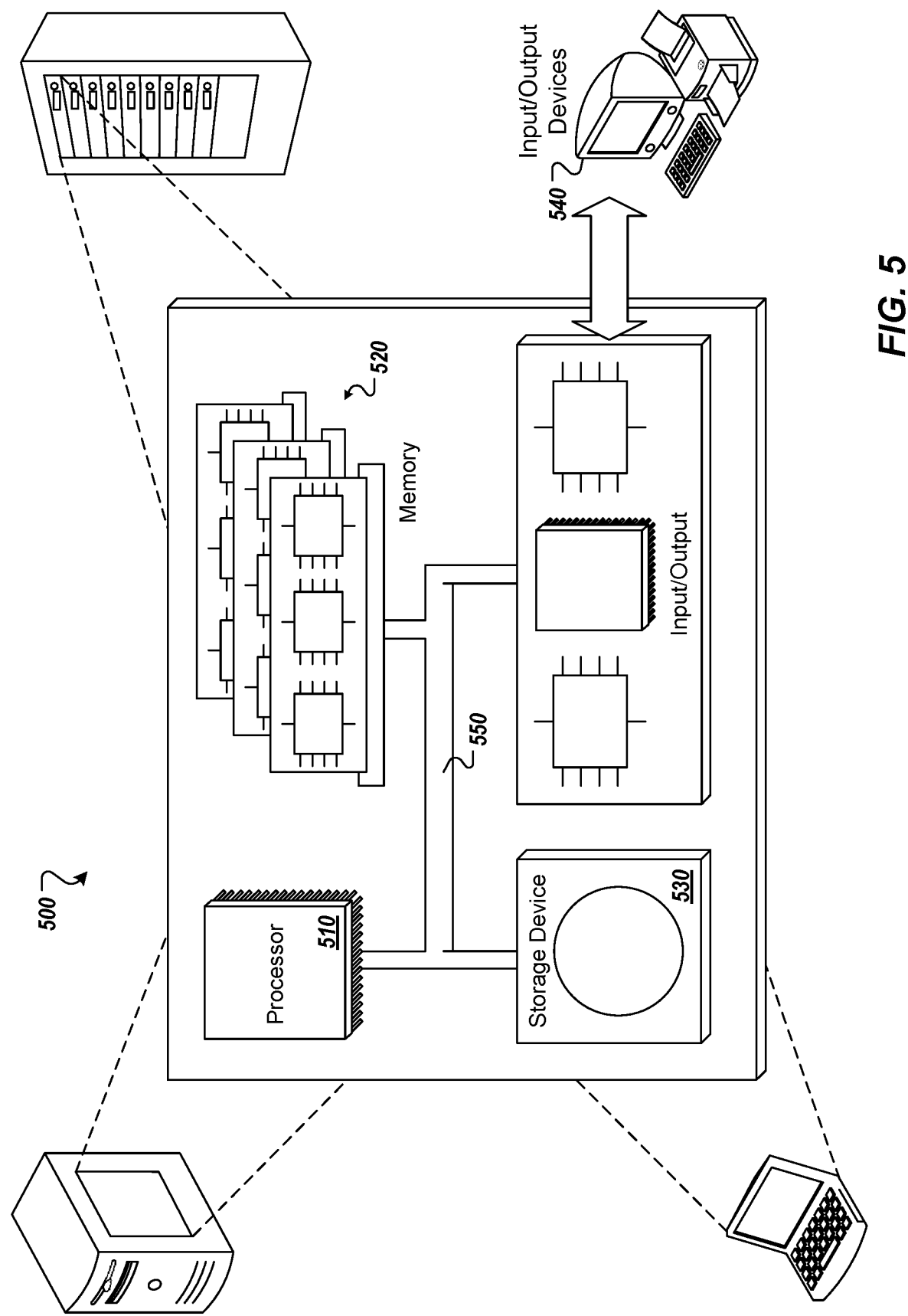
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device.

The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selectively scaling an application that is executed using one or more graphics processing units (GPUs) in a container orchestration system, the method being executed by one or more processors and comprising:
    executing, within the container orchestration system, the application using one or more resource units, each resource unit comprising an application container and an ancillary container, the ancillary container executing a set of GPU metric exporters;
    receiving, from the application and for each resource unit, a GPU metric comprising a GPU utilization associated with a respective resource unit, each GPU metric having a set of labels, a first label uniquely indicating a namespace within the container orchestration system and a second label uniquely indicating a resource unit;
    determining, for each resource unit, a custom GPU metric by a custom metrics adapter based on a respective GPU metric, the custom GPU metric aggregating values of the respective GPU metric over a time period;
    determining, by an autoscaler, an average GPU metric based on one or more custom GPU metrics; and
    selectively scaling, by the autoscaler, the application within the container orchestration system based on the average GPU metric by adjusting a number of resource units executing the application.

2. The method of claim 1, wherein the GPU metric comprises GPU utilization and the custom GPU metric comprises average GPU utilization over the time period.

3. The method of claim 1, wherein the GPU metric is received from a service executing with the application, the service exposing the application through a first port and exposing the GPU metric through a second port that is different from the first port.

4. The method of claim 1, wherein the autoscaler receives the custom GPU metric through an application programming interface (API), the custom metric being determined by a custom metric adapter that exposes the custom GPU metric through the API.

5. The method of claim 1, wherein selectively scaling comprises increasing the number of resource units in response to determining that a current number of resource units is less than a target number of resource units.

6. The method of claim 1, wherein selectively scaling comprises decreasing the number of resource units in response to determining that a current number of resource units greater than a target number of resource units.

7. The method of claim 1, wherein the container orchestration system comprises Kubernetes and each resource unit comprises a pod and the ancillary container comprises a sidecar container.

8. A non-transitory computer-readable storage medium coupled to one or more processors and having instructions stored thereon which, when executed by the one or more processors, cause the one or more processors to perform operations for managing a plurality of resources in a container orchestration system, the operations comprising:
    executing, within the container orchestration system, the application using one or more resource units, each resource unit comprising an application container and an ancillary container, the ancillary container executing a set of GPU metric exporters;
    receiving, from the application and for each resource unit, a GPU metric comprising a GPU utilization associated with a respective resource unit, each GPU metric having a set of labels, a first label uniquely indicating a namespace within the container orchestration system and a second label uniquely indicating a resource unit;
    determining, for each resource unit, a custom GPU metric based on a respective GPU metric, the custom GPU metric aggregating values of the respective GPU metric over a time period;
    determining, by an autoscaler, an average GPU metric based on one or more custom GPU metrics; and
    selectively scaling, by the autoscaler, the application within the container orchestration system based on the average GPU metric by adjusting a number of resource units executing the application.

9. The non-transitory computer-readable storage medium of claim 8, wherein the GPU metric comprises GPU utilization and the custom GPU metric comprises average GPU utilization over the time period.

10. The non-transitory computer-readable storage medium of claim 8, wherein the GPU metric is received from a service executing with the application, the service exposing the application through a first port and exposing the GPU metric through a second port that is different from the first port.

11. The non-transitory computer-readable storage medium of claim 8, wherein the autoscaler receives the custom GPU metric through an application programming interface (API), the custom metric being determined by a custom metric adapter that exposes the custom GPU metric through the API.

12. The non-transitory computer-readable storage medium of claim 8, wherein selectively scaling comprises increasing the number of resource units in response to determining that a current number of resource units is less than a target number of resource units.

13. The non-transitory computer-readable storage medium of claim 8, wherein selectively scaling comprises decreasing the number of resource units in response to determining that a current number of resource units greater than a target number of resource units.

14. The non-transitory computer-readable storage medium of claim 8, wherein the container orchestration system comprises Kubernetes and each resource unit comprises a pod and the ancillary container comprises a sidecar container.

15. A system, comprising:
    a computing device; and a computer-readable storage device coupled to the computing device and having instructions stored thereon which, when executed by the computing device, cause the computing device to perform operations for managing a plurality of resources in a container orchestration system, the operations comprising:

executing, within the container orchestration system, the application using one or more resource units, each resource unit comprising an application container and an ancillary container, the ancillary container executing a set of GPU metric exporters;

receiving, from the application and for each resource unit, a GPU metric comprising a GPU utilization associated with a respective resource unit, each GPU metric having a set of labels, a first label uniquely indicating a namespace within the container orchestration system and a second label uniquely indicating a resource unit;

determining, for each resource unit, a custom GPU metric based on a respective GPU metric, the custom GPU metric aggregating values of the respective GPU metric over a time period;

determining, by an autoscaler, an average GPU metric based on one or more custom GPU metrics; and selectively scaling, by the autoscaler, the application within the container orchestration system based on the average GPU metric by adjusting a number of resource units executing the application.

16. The system of claim 15, wherein the GPU metric comprises GPU utilization and the custom GPU metric comprises average GPU utilization over the time period.

17. The system of claim 15, wherein the GPU metric is received from a service executing with the application, the service exposing the application through a first port and exposing the GPU metric through a second port that is different from the first port.

18. The system of claim 15, wherein the autoscaler receives the custom GPU metric through an application programming interface (API), the custom metric being determined by a custom metric adapter that exposes the custom GPU metric through the API.

19. The system of claim 15, wherein selectively scaling comprises increasing the number of resource units in response to determining that a current number of resource units is less than a target number of resource units.

20. The system of claim 15, wherein selectively scaling comprises decreasing the number of resource units in response to determining that a current number of resource units greater than a target number of resource units.

\* \* \* \* \*